(12) United States Patent
Taneda

(10) Patent No.: US 7,684,982 B2
(45) Date of Patent: Mar. 23, 2010

(54) NOISE REDUCTION AND AUDIO-VISUAL SPEECH ACTIVITY DETECTION

(75) Inventor: Morio Taneda, Munich (DE)

(73) Assignee: Sony Ericsson Communications AB, Lund (SE)

( * ) Notice: Subject to any disclaimer, the term of this patent is extended or adjusted under 35 U.S.C. 154(b) by 1055 days.

(21) Appl. No.: 10/542,869

(22) PCT Filed: Jan. 9, 2004

(86) PCT No.: PCT/EP2004/000104

§ 371 (c)(1),
(2), (4) Date: Mar. 3, 2006

(87) PCT Pub. No.: WO2004/066273

PCT Pub. Date: Aug. 5, 2004

(65) Prior Publication Data

US 2006/0224382 A1 Oct. 5, 2006

(30) Foreign Application Priority Data

Jan. 24, 2003 (EP) .............................. 03001637
Oct. 2, 2003 (EP) .............................. 03022561

(51) Int. Cl.
*G10L 21/02* (2006.01)

(52) U.S. Cl. .................. 704/233; 704/270; 379/88.01; 379/463.03; 379/392.01; 382/118; 382/190

(58) Field of Classification Search ................ 704/233, 704/25, 270; 379/88.01, 406.03, 392.01; 382/118, 190

See application file for complete search history.

(56) References Cited

U.S. PATENT DOCUMENTS 5,706,394 A * 1/1998 Wynn .................. 704/219

(Continued)

FOREIGN PATENT DOCUMENTS

WO    WO 02/29784 A1    4/2002
WO    WO 02/084644 A1   10/2002

OTHER PUBLICATIONS

Communication pursuant to Article 96(2) EPC (3 pages) corresponding to European Application No. 03022561.9; Dated: Feb. 9, 2007.

(Continued)

*Primary Examiner*—Daniel D Abebe
(74) *Attorney, Agent, or Firm*—Myers Bigel Sibley & Sajovec (57) ABSTRACT

A noise reduction system including an audio-visual user interface combines visual features extracted from a digital video sequence with audio features extracted from an analog audio sequence. The digital video sequence may show the face of a speaker, and the analog audio sequence may include background noise in an environment of said speaker. Audio sequence detection means are used to detect said analog audio sequence, and audio feature extraction and analysis means are used to analyze said analog audio sequence and extract said audio features therefrom. Video sequence detection means are used to detect said video sequence, and visual feature extraction and analysis means are used to analyze the detected video sequence and extract said visual features therefrom. A noise reduction circuit is configured to separate the speaker's voice from said background noise based on a combination of derived speech characteristics and output a speech activity indication signal. The speech activity indication signal includes a combination of speech activity estimates supplied by said audio feature extraction and analysis means and said visual feature extraction and analysis means. A multi-channel acoustic echo cancellation unit is configured to perform a near-end speaker detection and double-talk detection algorithm based on the speech characteristics derived by said audio feature extraction and analysis means and said visual feature extraction and analysis means.

15 Claims, 7 Drawing Sheets

U.S. PATENT DOCUMENTS

| | | | | |
|---|---|---|---|---|
| 5,999,525 | A | * | 12/1999 | Krishnaswamy et al. .... 370/352 |
| 6,483,532 | B1 | * | 11/2002 | Girod ...................... 348/14.12 |
| 6,510,224 | B1 | * | 1/2003 | Christensson et al. .. 379/406.03 |
| 6,594,629 | B1 | * | 7/2003 | Basu et al. .................. 704/251 |
| 6,754,373 | B1 | * | 6/2004 | de Cuetos et al. ........... 382/118 |
| 2002/0052746 | A1 | * | 5/2002 | Handelman ................. 704/270 |
| 2002/0116186 | A1 | * | 8/2002 | Strauss et al. ............... 704/233 |
| 2003/0007633 | A1 | | 1/2003 | Tucker et al. |
| 2003/0018475 | A1 | * | 1/2003 | Basu et al. .................. 704/270 |
| 2003/0179888 | A1 | * | 9/2003 | Burnett et al. ............. 381/71.8 |
| 2004/0133421 | A1 | * | 7/2004 | Burnett et al. .............. 704/215 |
| 2004/0260550 | A1 | * | 12/2004 | Burges et al. ............... 704/259 |
| 2005/0027520 | A1 | * | 2/2005 | Mattila et al. ............... 704/228 |
| 2008/0249779 | A1 | * | 10/2008 | Hennecke ................... 704/270 |

OTHER PUBLICATIONS

Girin et al. *Noisy Speech Enhancement by Fusion of Auditory and Visual Information: A Study of Vowel Transitions*, ISSN 1018-4074; pp. 2555-2558 (1997).

International Search Report corresponding to European Application No. PCT/EP04/000104 mailed May 28, 2004.

International Preliminary Examination Report corresponding to European Application No. PCT/EP04/000104 mailed May 28, 2004.

* cited by examiner

NOISE REDUCTION AND AUDIO-VISUAL SPEECH ACTIVITY DETECTION

CROSS-REFERENCE TO RELATED APPLICATIONS

This application claims priority under 35 U.S.C. 0371 from PCT International Application No. PCT/EP2004/000104, filed on Jan. 9, 2004, which claims priority from European Patent Application Serial No. 03022561.9 filed Oct. 2, 2003, and European Patent Application Serial No. 03001637.2 filed on Jan. 24, 2003, the disclosures and contents of which are incorporated by reference herein in their entireties. The above PCT International Application was published in the English language and has International Publication No. WO 2004/066273.

FIELD AND BACKGROUND OF THE INVENTION

The present invention generally relates to the field of noise reduction based on speech activity recognition, in particular to an audio-visual user interface of a telecommunication device running an application that can advantageously be used e.g. for a near-speaker detection algorithm in an environment where a speaker's voice is interfered by a statistically distributed background noise including environmental noise as well as surrounding persons' voices.

Discontinuous transmission of speech signals based on speech/pause detection represents a valid solution to improve the spectral efficiency of new-generation wireless communication systems. In this context, robust voice activity detection algorithms are required, as conventional solutions according to the state of the art present a high misclassification rate in the presence of the background noise typical of mobile environments.

A voice activity detector (VAD) aims to distinguish between a speech signal and several types of acoustic background noise even with low signal-to-noise ratios (SNRs). Therefore, in a typical telephone conversation, such a VAD, together with a comfort noise generator (CNG), is used to achieve silence compression. In the field of multimedia communications, silence compression allows a speech channel to be shared with other types of information, thus guaranteeing simultaneous voice and data applications. In cellular radio systems which are based the Discontinuous Transmission (DTX) mode, such as GSM, VADs are applied to reduce co-channel interference and power consumption of the portable equipment. Furthermore, a VAD is vital to reduce the average data bit rate in future generations of digital cellular networks such as the UMTS, which provide for a variable bit-rate (VBR) speech coding. Most of the capacity gain is due to the distinction between speech activity and inactivity. The performance of a speech coding approach which is based on phonetic classification, however, strongly depends on the classifier, which must be robust to every type of background noise. As is well known, the performance of a VAD is critical for the overall speech quality, in particular with low SNRs. In case speech frames are detected as noise, intelligibility is seriously impaired owing to speech clipping in the conversation. If, on the other hand, the percentage of noise detected as speech is high, the potential advantages of silence compression are not obtained. In the presence of background noise it may be difficult to distinguish between speech and silence. Hence, for voice activity detection in wireless environments more efficient algorithms are needed.

Although the Fuzzy Voice Activity Detector (FVAD) proposed in "Improved VAD G.729 Annex B for Mobile Communications Using Soft Computing" (Contribution ITU-T, Study Group 16, Question 19/16, Washington, Sep. 2-5, 1997) by F. Beritelli, S. Casale, and A. Cavallaro performs better than other solutions presented in literature, it exhibits an activity increase, above all in the presence of non-stationary noise. The functional scheme of the FVAD is based on a traditional pattern recognition approach wherein the four differential parameters used for speech activity/inactivity classification are the full-band energy difference, the low-band energy difference, the zero-crossing difference, and the spectral distortion. The matching phase is performed by a set of fuzzy rules obtained automatically by means of a new hybrid learning tool as described in "FuGeNeSys: Fuzzy Genetic Neural System for Fuzzy Modeling" by M. Russo (to appear in IEEE Transaction on Fuzzy Systems). As is well known, a fuzzy system allows a gradual, continuous transition rather than a sharp change between two values. Thus, the Fuzzy VAD returns a continuous output signal ranging from 0 (non-activity) to 1 (activity), which does not depend on whether single input signals have exceeded a predefined threshold or not, but on an overall evaluation of the values they have assumed ("defuzzyfication process"). The final decision is made by comparing the output of the fuzzy system, which varies in a range between 0 and 1, with a fixed threshold experimentally chosen as described in "Voice Control of the Pan-European Digital Mobile Radio System" (ICC '89, pp. 1070-1074) by C. B. Southcott et al.

Just as voice activity detectors conventional automatic speech recognition (ASR) systems also experience difficulties when being operated in noisy environments since accuracy of conventional ASR algorithms largely decreases in noisy environments. When a speaker is talking in a noisy environment including both ambient noise as well as surrounding persons' interfering voices, a microphone picks up not only the speaker's voice but also these background sounds. Consequently, an audio signal which encompasses the speaker's voice superimposed by said background sounds is processed. The louder the interfering sounds, the more the acoustic comprehensibility of the speaker is reduced. To overcome this problem, noise reduction circuitries are applied that take use of the different frequency regions of environmental noise and the respective speaker's voice.

Figure 2A:
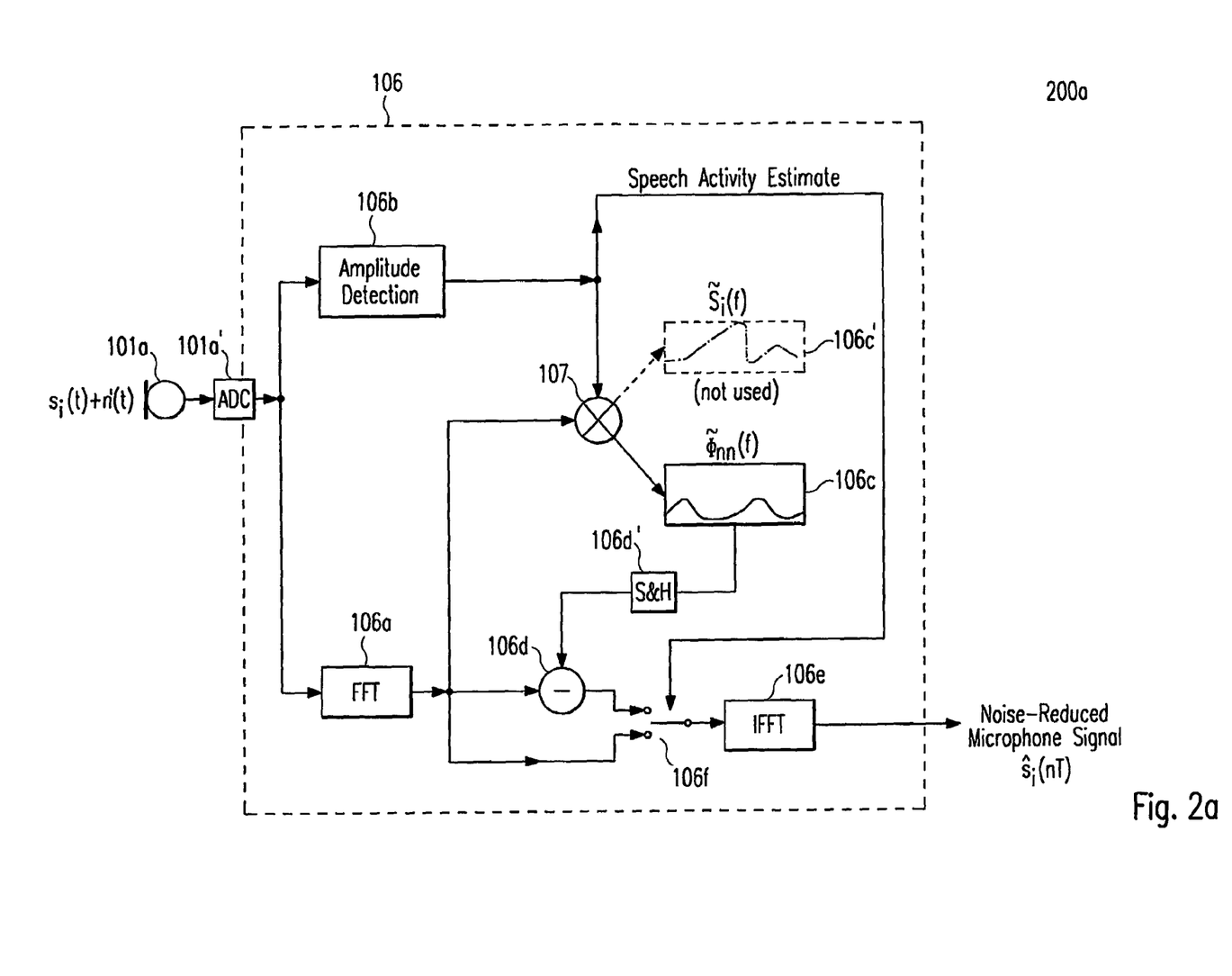
FIG. 2a is a block diagram showing a conventional noise reduction and speech activity recognition system for a telephony-based application based on an audio speech activity estimation according to the state of the art.

A typical noise reduction circuitry for a telephony-based application based on a speech activity estimation algorithm according to the state of the art that implements a method for correlating the discrete signal spectrum $S(k \cdot \Delta f)$ of an analog-to-digital-converted audio signal $s(t)$ with an audio speech activity estimate is shown in FIG. 2a. Said audio speech activity estimate is obtained by an amplitude detection of the digital audio signal $s(nT)$. The circuit outputs a noise-reduced audio signal $\hat{s}_r(nT)$, which is calculated by subjecting the difference of the discrete signal spectrum $S(k \cdot \Delta f)$ and a sampled version $\tilde{\Phi}_{nn}(k \cdot \Delta f)$ of the estimated noise power density spectrum $\tilde{\Phi}_{nn}(f)$ of a statistically distributed background noise $\tilde{n}(t)$ to an Inverse Fast Fourier Transform (IFFT).

BRIEF DESCRIPTION OF THE STATE OF THE ART

The invention described in U.S. Pat. No. 5,313,522 refers to a device for facilitating comprehension by a hearing-impaired person participating in a telephone conversation, which comprises a circuitry for converting received audio speech signals into a series of phonemes and an arrangement for coupling the circuitry to a POTS line. The circuit thereby includes an arrangement which correlates the detected series of phonemes with recorded lip movements of a speaker and displays these lip movements in subsequent images on a display device, thereby permitting the hearing-impaired person to carry out a lipreading procedure while listening to the telephone conversation, which improves the person's level of comprehension.

The invention disclosed in WO 99/52097 pertains to a communication device and a method for sensing the movements of a speaker's lips, generating an audio signal corresponding to detected lip movements of said speaker and transmitting said audio signal, thereby sensing a level of ambient noise and accordingly controlling the power level of the audio signal to be transmitted.

OBJECT OF THE UNDERLYING INVENTION

In view of the state of the art mentioned above, it is the object of the present invention to enhance the speech/pause detection accuracy of a telephony-based voice activity detection (VAD) system. In particular, it is the object of the invention to increase the signal-to-interference ratio (SIR) of a recorded speech signal in crowded environments where a speaker's voice is severely interfered by ambient noise and/or surrounding persons' voices.

The aforementioned object is achieved by means of the features in the independent claims. Advantageous features are defined in the subordinate claims.

SUMMARY OF THE INVENTION

The present invention is dedicated to a noise reduction and automatic speech activity recognition system having an audio-visual user interface, wherein said system is adapted for running an application for combining a visual feature vector $\underline{o}_{v,nT}$ that comprises features extracted from a digital video sequence v(nT) showing a speaker's face by detecting and analyzing e.g. lip movements and/or facial expressions of said speaker $S_i$ with an audio feature vector $\underline{o}_{a,nT}$ which comprises features extracted from a recorded analog audio sequence s(t). Said audio sequence s(t) thereby represents the voice of said speaker $S_i$ interfered by a statistically distributed background noise $$n'(t)=n(t)+s_{Int}(t), \quad (1)$$

which includes both environmental noise n(t) and a weighted sum of surrounding persons' interfering voices $$s_{Int}(t) \propto \sum_{j=1}^{N} a_j \cdot s_j(t - T_j) (\text{for } j \neq i) \quad (2a)$$

$$\text{with } a_j = \frac{1}{4\pi \cdot R_{jM}^2} [m^{-2}] \quad (2b)$$

in the environment of said speaker $S_i$. Thereby, N denotes the total number of speakers (inclusive of said speaker $S_i$), $a_j$ is the attenuation factor for the interference signal $s_j(t)$ of the j-th speaker $S_j$ in the environment of the speaker $S_i$, $T_j$ is the delay of $s_j(t)$, and $R_{jM}$ denotes the distance between the j-th speaker $S_j$ and a microphone recording the audio signal s(t). By tracking the lip movement of a speaker, visual features are extracted which can then be analyzed and used for further processing. For this reason, the bimodal perceptual user interface comprises a video camera pointing to the speaker's face for recording a digital video sequence v(nT) showing lip movements and/or facial expressions of said speaker $S_i$, audio feature extraction and analyzing means for determining acoustic-phonetic speech characteristics of the speaker's voice and pronunciation based on the recorded audio sequence s(t), and visual feature extraction and analyzing means for continuously or intermittently determining the current location of the speaker's face, tracking lip movements and/or facial expressions of the speaker in subsequent images and determining acoustic-phonetic speech characteristics of the speaker's voice and pronunciation based on the detected lip movements and/or facial expressions.

According to the invention, the aforementioned extracted and analyzed visual features are fed to a noise reduction circuit that is needed to increase the signal-to-interference ratio (SIR) of the recorded audio signal s(t). Said noise reduction circuit is specially adapted to perform a near-speaker detection by separating the speaker's voice from said background noise ñ(t) based on the derived acoustic-phonetic speech characteristics $$\underline{o}_{av,nT} := [\underline{o}_{a,nT}^T, \underline{o}_{v,nT}^T]^T \quad (3)$$

It outputs a speech activity indication signal ($\hat{s}_i(nT)$) which is obtained by a combination of speech activity estimates supplied by said audio feature extraction and analyzing means as well as said visual feature extraction and analyzing means.

BRIEF DESCRIPTION OF THE DRAWINGS

Advantageous features, aspects, and useful embodiments of the invention will become evident from the following description, the appended claims, and the accompanying drawings. Thereby.

DETAILED DESCRIPTION OF THE UNDERLYING INVENTION

In the following, different embodiments of the present invention as depicted in FIGS. 1, 2b, 2c, and 3a-c shall be explained in detail. The meaning of the symbols designated with reference numerals and signs in FIGS. 1 to 3c can be taken from an annexed table.

Figure 1:
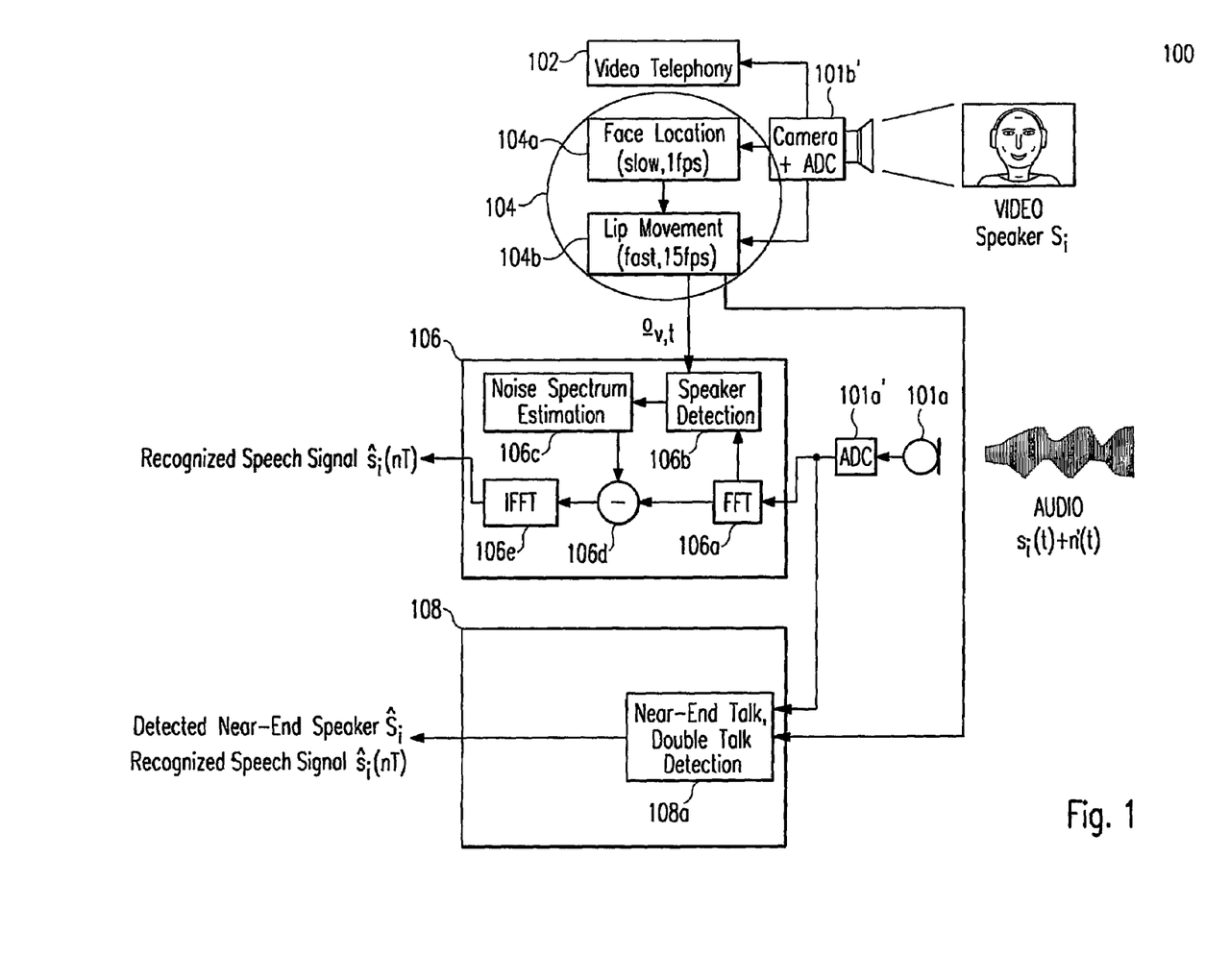
FIG. 1 shows a noise reduction and speech activity recognition system having an audio-visual user interface, said system being specially adapted for running a real-time lip tracking application which combines visual features $\underline{o}_{v,nT}$ extracted from a digital video sequence v(nT) showing the face of a speaker $S_i$ by detecting and analyzing the speaker's lip movements and/or facial expressions with audio features $\underline{o}_{a,nT}$ extracted from an analog audio sequence s(t) representing the voice of said speaker $S_i$ interfered by a statistically distributed background noise n'(t)

According to a first embodiment of the invention as depicted in FIG. 1, said noise reduction and speech activity recognition system 100 comprises a noise reduction circuit 106 which is specially adapted to reduce the background noise n'(t) received by a microphone 101a and to perform a near-speaker detection by separating the speaker's voice from said background noise n'(t) as well as a multi-channel acoustic echo cancellation unit 108 being specially adapted to perform a near-end speaker detection and/or double-talk detection algorithm based on acoustic-phonetic speech characteristics derived with the aid of the aforementioned audio and visual feature extraction and analyzing means 104a+b and 106b, respectively. Thereby, said acoustic-phonetic speech characteristics are based on the opening of a speaker's mouth as an estimate of the acoustic energy of articulated vowels or diphthongs, respectively, rapid movement of the speaker's lips as a hint to labial or labio-dental consonants (e.g. plosive, fricative or affricative phonemes—voiced or unvoiced, respectively), and other statistically detected phonetic characteristics of an association between position and movement of the lips and the voice and pronunciation of a speaker $S_i$.

The aforementioned noise reduction circuit 106 comprises digital signal processing means 106a for calculating a discrete signal spectrum $S(k \cdot \Delta f)$ that corresponds to an analog-to-digital-converted version s(nT) of the recorded audio sequence s(t) by performing a Fast Fourier Transform (FFT), audio feature extraction and analyzing means 106b (e.g. an amplitude detector) for detecting acoustic-phonetic speech characteristics of a speaker's voice and pronunciation based on the recorded audio sequence s(t), means 106c for estimating the noise power density spectrum $\Phi_{nn}(f)$ of the statistically distributed background noise n'(t) based on the result of the speaker detection procedure performed by said audio feature extraction and analyzing means 106b, a subtracting element 106d for subtracting a discretized version $\Phi_{nn}(k \cdot \Delta f)$ of the estimated noise power density spectrum $\tilde{\Phi}_{nn}(f)$ from the discrete signal spectrum $S(k \cdot \Delta f)$ of the analog-to-digital-converted audio sequence s(nT), and digital signal processing means 106e for calculating the corresponding discrete time-domain signal $\hat{s}_i(nT)$ of the obtained difference signal by performing an Inverse Fast Fourier Transform (IFFT).

The depicted noise reduction and speech activity recognition system 100 comprises audio feature extraction and analyzing means 106b which are used for determining acoustic-phonetic speech characteristics of the speaker's voice and pronunciation ($\underline{o}_{a,nT}$) based on the recorded audio sequence s(t) and visual feature extraction and analyzing means 104a+b for determining the current location of the speaker's face at a data rate of 1 frame/s, tracking lip movements and/or facial expressions of said speaker $S_i$ at a data rate of 15 frames/s and determining acoustic-phonetic speech characteristics of the speaker's voice and pronunciation based on detected lip movements and/or facial expressions ($\underline{o}_{v,nT}$).

As depicted in FIG. 1, said noise reduction system 200b/c can advantageously be used for a video-telephony based application in a telecommunication system running on a video-enabled phone 102 which is equipped with a built-in video camera 101b' pointing at the face of a speaker $S_i$ participating in a video telephony session.

Figure 2B:
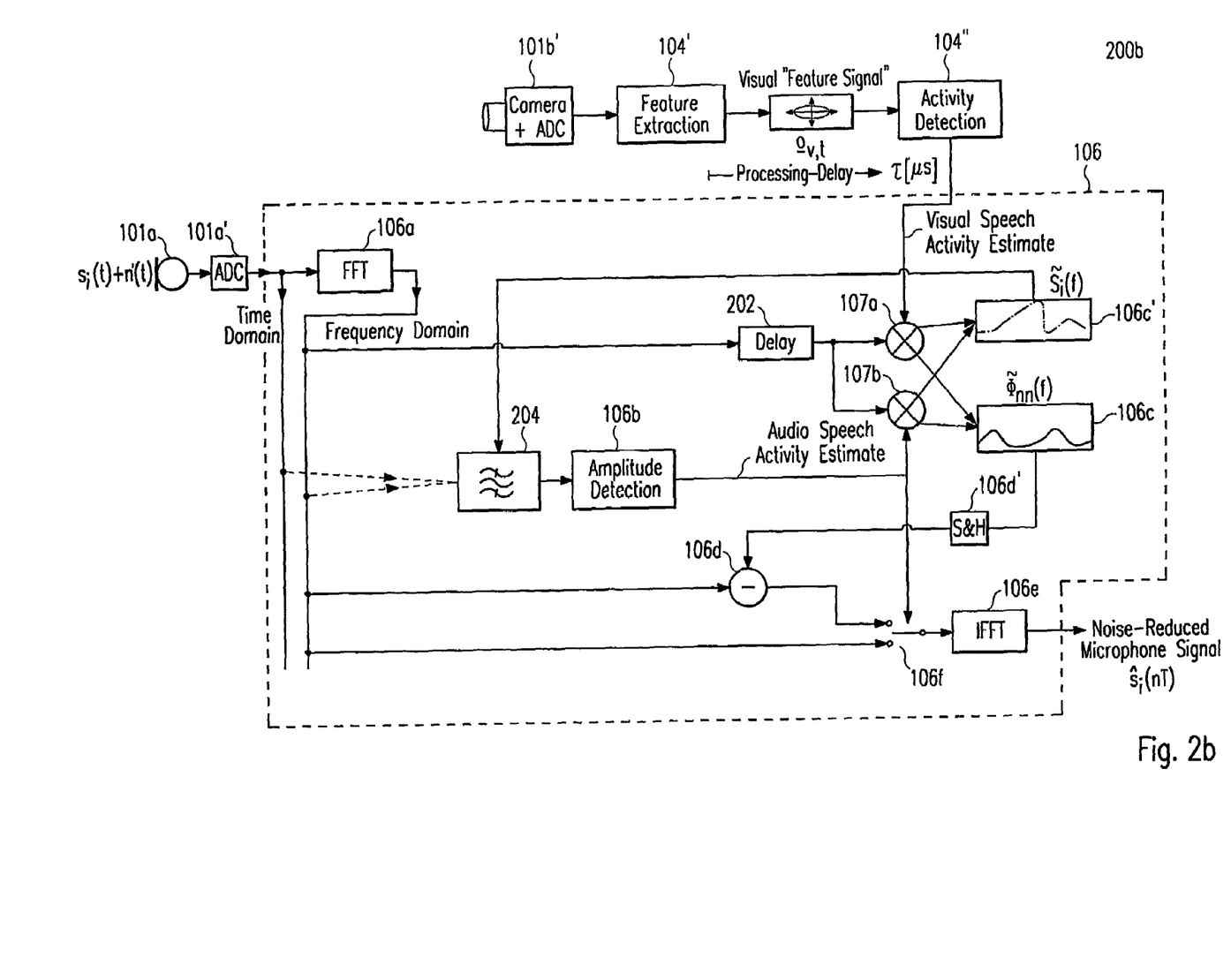
FIG. 2b shows an example of a camera-enhanced noise reduction and speech activity recognition system for a telephony-based application that implements an audio-visual speech activity estimation algorithm according to one embodiment of the present invention.

FIG. 2b shows an example of a slow camera-enhanced noise reduction and speech activity recognition system 200b for a telephony-based application which implements an audio-visual speech activity estimation algorithm according to one embodiment of the present invention. Thereby, an audio speech activity estimate taken from an audio feature vector $\underline{o}_{a,t}$ supplied by said audio feature extraction and analyzing means 106b is correlated with a further speech activity estimate that is obtained by calculating the difference of the discrete signal spectrum $S(k \cdot \Delta f)$ and a sampled version $\tilde{\Phi}_{nn}(k \cdot \Delta f)$ of the estimated noise power density spectrum $\tilde{\Phi}_{nn}(f)$ of the statistically distributed background noise n'(t). Said audio speech activity estimate is obtained by an amplitude detection of the band-pass-filtered discrete signal spectrum $S(k \cdot \Delta f)$ of the analog-to-digital-converted audio signal s(t).

Similar to the embodiment depicted in FIG. 1, the noise reduction and speech activity recognition system 200b depicted in FIG. 2b comprises an audio feature extraction and analyzing means 106b (e.g. an amplitude detector) which is used for determining acoustic-phonetic speech characteristics of the speaker's voice and pronunciation ($\underline{o}_{a,nT}$) based on the recorded audio sequence s(t) and visual feature extraction and analyzing means 104' and 104" for determining the current location of the speaker's face at a data rate of 1 frame/s, tracking lip movements and facial expressions of said speaker $S_i$ at a data rate of 15 frames/s and determining acoustic-phonetic speech characteristics of the speaker's voice and pronunciation based on detected lip movements and/or facial expressions ($\underline{o}_{v,nT}$). Thereby, said audio feature extraction and analyzing means 106b can simply be realized as an amplitude detector.

Aside from the components 106a-e described above with reference to FIG. 1, the noise reduction circuit 106 depicted in FIG. 2b comprises a delay element 204, which provides a delayed version of the discrete signal spectrum $S(k \cdot \Delta f)$ of the analog-to-digital-converted audio signal s(t), a first multiplier element 107a, which is used for correlating (S9) the discrete signal spectrum $S_\tau(k \cdot \Delta f)$ of a delayed version s(nT−τ) of the analog-to-digital-converted audio signal s(nT) with a visual speech activity estimate taken from a visual feature vector $\underline{o}_{v,t}$ supplied by the visual feature extraction and analyzing means 104a+b and/or 104'+104", thus yielding a further estimate $\tilde{S}_i'(f)$ for updating the estimate $\tilde{S}_i(f)$ for the frequency spectrum $S_i(f)$ corresponding to the signal $s_i(t)$ that represents said speaker's voice as well as a further estimate $\tilde{\Phi}_{nn}'(f)$ for updating the estimate $\tilde{\Phi}_{nn}(f)$ for the noise power density spectrum $\Phi_{nn}(f)$ of the statistically distributed background noise n'(t), and a second multiplier element 107, which is used for correlating (S8a) the discrete signal spectrum $S_\tau(k \cdot \Delta f)$ of a delayed version s(nT−τ) of the analog-to-digital-converted audio signal s(nT) with an audio speech activity estimate obtained by an amplitude detection (S8b) of the band-pass-filtered discrete signal spectrum $S(k \cdot \Delta f)$, thus yielding an estimate $\tilde{S}_i(f)$ for the frequency spectrum $S_i(f)$ which corresponds to the signal $s_i(t)$ that represents said speaker's voice and an estimate $\tilde{\Phi}_{nn}(f)$ for the noise power density spectrum $\Phi_{nn}(f)$ of said background noise n'(t). A sample-and-hold (S&H) element 106d' provides a sampled version $\tilde{\Phi}_{nn}(k \cdot \Delta f)$ of the estimated noise power density spectrum $\tilde{\Phi}_{nn}(f)$. The noise reduction circuit 106 further comprises a band-pass filter with adjustable cut-off frequencies, which is used for filtering the discrete signal spectrum S(k·Δf) of the analog-to-digital-converted audio signal s(t). The cut-off frequencies can be adjusted dependent on the bandwidth of the estimated speech signal spectrum $\tilde{S}_i(f)$. A switch 106f is provided for selectively switching between a first and a second mode for receiving said speech signal $s_i(t)$ with and without using the proposed audio-visual speech recognition approach providing a noise-reduced speech signal $\hat{s}_i(t)$, respectively. According to a further aspect of the present invention, means are provided for switching said microphone 101a off when the actual level of the speech activity indication signal $\hat{s}_i(nT)$ falls below a predefined threshold value (not shown).

Figure 2C:
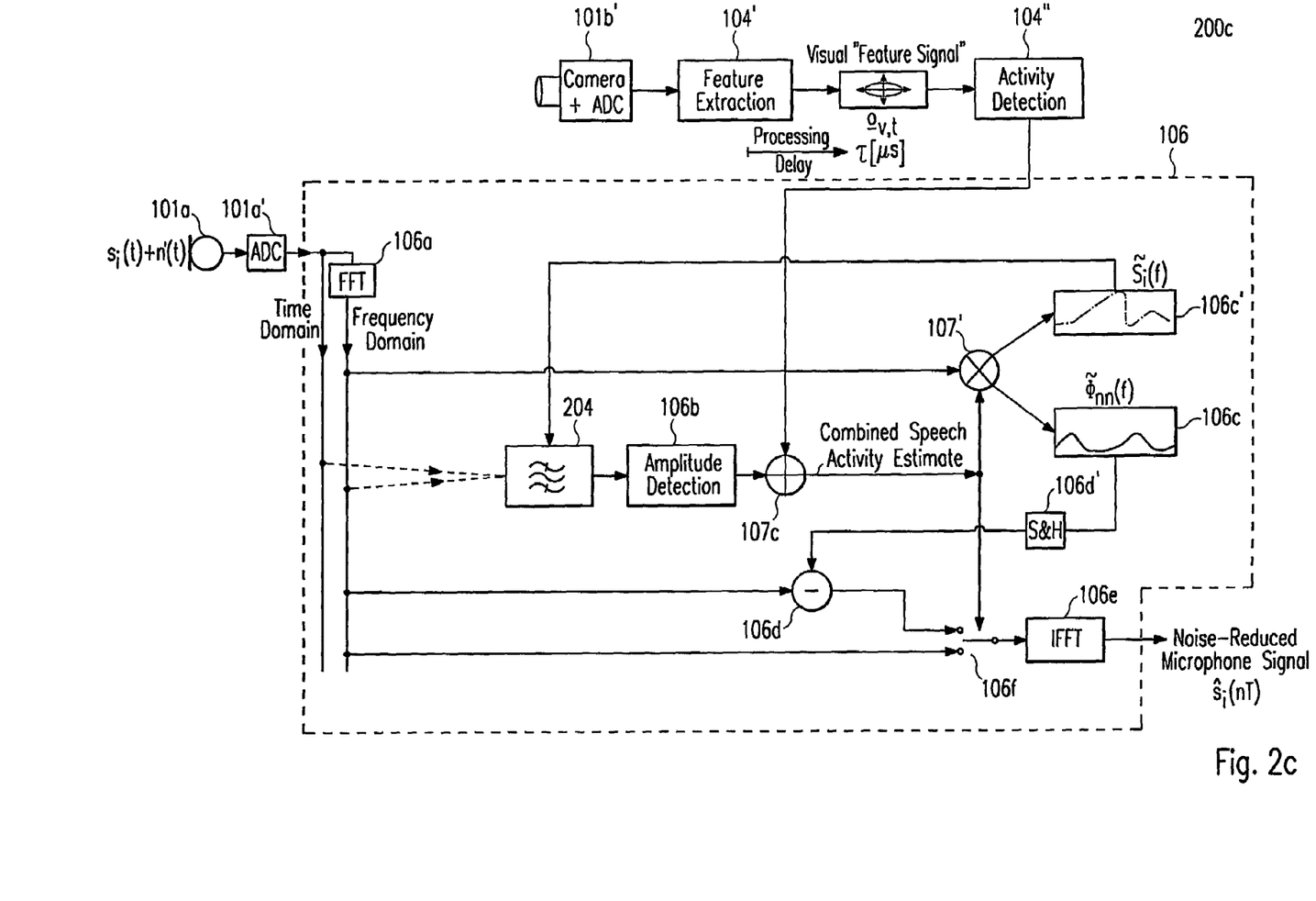
FIG. 2c shows an example of a camera-enhanced noise reduction and speech activity recognition system for a telephony-based application that implements an audio-visual speech activity estimation algorithm according to a further embodiment of the present invention.

An example of a fast camera-enhanced noise reduction and speech activity recognition system 200c for a telephony-based application which implements an audio-visual speech activity estimation algorithm according to a further embodiment of the present invention is depicted in FIG. 2c. The circuitry correlates a discrete signal spectrum S(k·Δf) of the analog-to-digital-converted audio signal s(t) with a delayed version of an audio-visual speech activity estimate and a further speech activity estimate obtained by calculating the difference spectrum of the discrete signal spectrum S(k·Δf) and a sampled version $\tilde{\Phi}_{nn}(k \cdot \Delta f)$ of the estimated noise power density spectrum $\tilde{\Phi}_{nn}(f)$. The aforementioned audio-visual speech activity estimate is taken from an audio-visual feature vector $\underline{o}_{av,t}$ obtained by combining an audio feature vector $\underline{o}_{a,t}$ supplied by said audio feature extraction and analyzing means 106b with a visual feature vector $\underline{o}_{v,t}$ supplied by said visual speech activity detection module 104''.

Aside from the components described above with reference to FIG. 1, the noise reduction circuit 106 depicted in FIG. 2c comprises a summation element 107c, which is used for adding (S11a) an audio speech activity estimate supplied from an audio feature extraction and analyzing means 106b (e.g. an amplitude detector) for determining acoustic-phonetic speech characteristics of the speaker's voice and pronunciation ($\underline{o}_{a,nT}$) based on the recorded audio sequence s(t) to an visual speech activity estimate supplied from visual feature extraction and analyzing means 104' and 104'' for determining the current location of the speaker's face at a data rate of 1 frame/s, tracking lip movements and facial expressions of said speaker $S_i$ at a data rate of 15 frames/s and determining acoustic-phonetic speech characteristics of the speaker's voice and pronunciation based on detected lip movements and/or facial expressions ($\underline{o}_{v,nT}$), thus yielding an audio-visual speech activity estimate. The noise reduction circuit 106 further comprises a multiplier element 107', which is used for correlating (S11b) the discrete signal spectrum S(k·Δf) of the analog-to-digital-converted audio signal s(t) with an audio-visual speech activity estimate, obtained by combining an audio feature vector $\underline{o}_{a,t}$ supplied by said audio feature extraction and analyzing means 106b with a visual feature vector $\underline{o}_{v,t}$ supplied by said visual speech activity detection module 104'', thereby yielding an estimate $\tilde{S}_i(f)$ for the frequency spectrum $S_i(f)$ which corresponds to the signal $s_i(t)$ that represents the speaker's voice and an estimate $\tilde{\Phi}_{nn}(f)$ for the noise power density spectrum $\Phi_{nn}(f)$ of the statistically distributed background noise n'(t). A sample-and-hold (S&H) element 106d' provides a sampled version $\tilde{\Phi}_{nn}(k \cdot \Delta f)$ of the estimated noise power density spectrum $\tilde{\Phi}_{nn}(f)$. The noise reduction circuit 106 further comprises a band-pass filter with adjustable cut-off frequencies, which is used for filtering the discrete signal spectrum S(k·Δf) of the analog-to-digital-converted audio signal s(t). Said cut-off frequencies can be adjusted dependent on the bandwidth of the estimated speech signal spectrum $\tilde{S}_i(f)$. A switch 106f is provided for selectively switching between a first and a second mode for receiving said speech signal $s_i(t)$ with and without using the proposed audio-visual speech recognition approach providing a noise-reduced speech signal $\hat{s}_i(t)$, respectively. According to a further aspect of the present invention, said noise reduction system 200c comprises means (SW) for switching said microphone 101a off when the actual level of the speech activity indication signal $\hat{s}_i(nT)$ falls below a predefined threshold value (not shown).

Figure 3A:
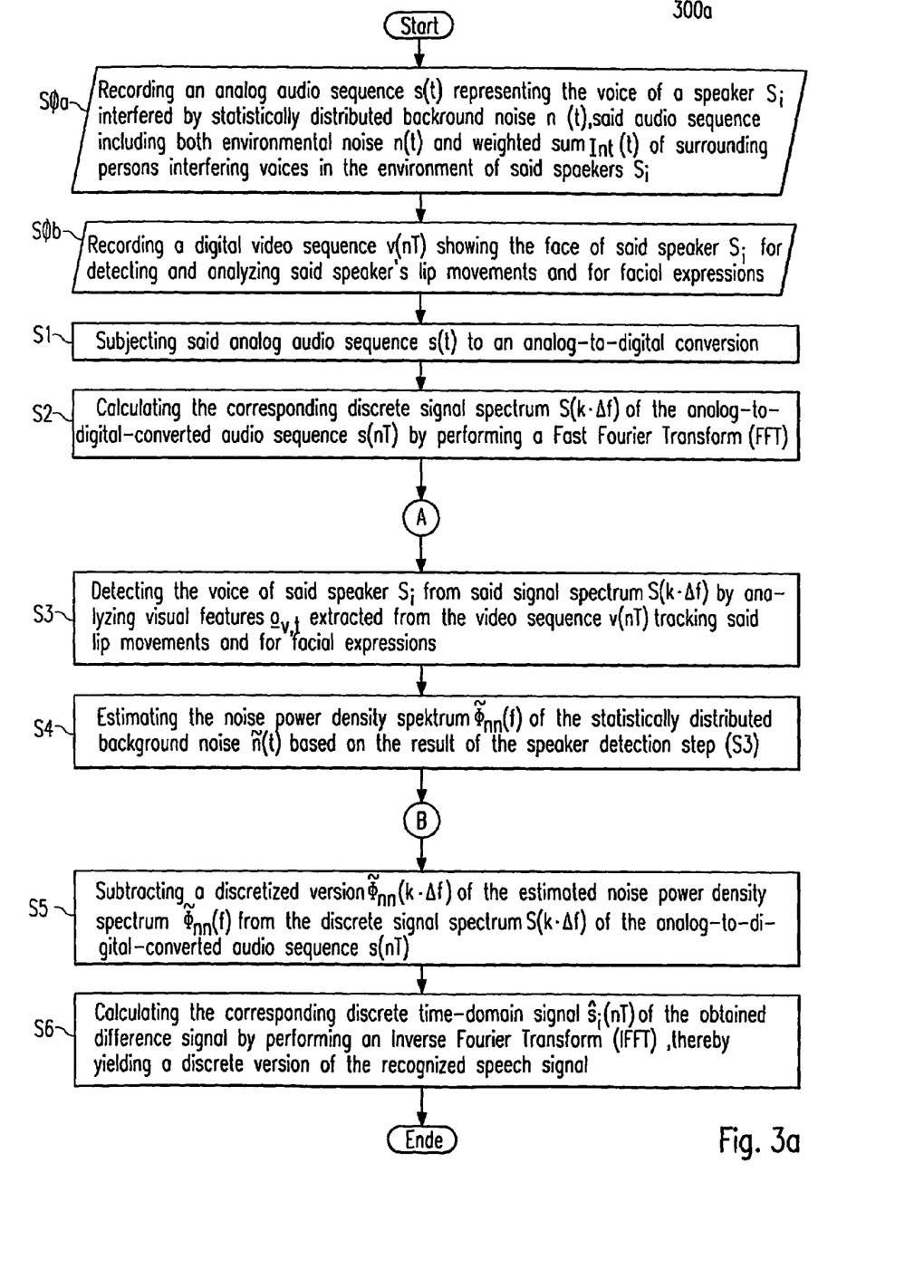
FIG. 3a shows a flow chart illustrating a near-end speaker detection method reducing the noise level of a detected analog audio sequence s(t) according to the embodiment depicted in FIG. 1 of the present invention.

A still further embodiment of the present invention is directed to a near-end speaker detection method as shown in the flow chart depicted in FIG. 3a. Said method reduces the noise level of a recorded analog audio sequence s(t) being interfered by a statistically distributed background noise n'(t), said audio sequence representing the voice of a speaker $S_i$. After having subjected (S1) the analog audio sequence s(t) to an analog-to-digital conversion, the corresponding discrete signal spectrum S(k·Δf) of the analog-to-digital-converted audio sequence s(nT) is calculated (S2) by performing a Fast Fourier Transform (FFT) and the voice of said speaker $S_i$ is detected (S3) from said signal spectrum S(k·Δf) by analyzing visual features extracted from a simultaneously with the recording of the analog audio sequence s(t) recorded video sequence v(nT) tracking the current location of the speaker's face, lip movements and/or facial expressions of the speaker $S_i$ in subsequent images. Next, the noise power density spectrum $\tilde{\Phi}_{nn}(f)$ of the statistically distributed background noise n'(t) is estimated (S4) based on the result of the speaker detection step (S3), whereupon a sampled version $\tilde{\Phi}_{nn}(k \cdot \Delta f)$ of the estimated noise power density spectrum $\tilde{\Phi}_{nn}(f)$ is subtracted (S5) from the discrete spectrum S(k·Δf) of the analog-to-digital-converted audio sequence s(nT). Finally, the corresponding discrete time-domain signal $\hat{s}_i(nT)$ of the obtained difference signal, which represents a discrete version of the recognized speech signal, is calculated (S6) by performing an Inverse Fast Fourier Transform (IFFT).

Optionally, a multi-channel acoustic echo cancellation algorithm which models echo path impulse responses by means of adaptive finite impulse response (FIR) filters and subtracts echo signals from the analog audio sequence s(t) can be conducted (S7) based on acoustic-phonetic speech characteristics derived by an algorithm for extracting visual features from a video sequence tracking the location of a speaker's face, lip movements and/or facial expressions of the speaker $S_i$ in subsequent images. Said multi-channel acoustic echo cancellation algorithm thereby performs a double-talk detection procedure.

According to a further aspect of the invention, a learning procedure is applied which enhances the step of detecting (S3) the voice of said speaker $S_i$ from the discrete signal spectrum S(k·Δf) of the analog-to-digital-converted version s(nT) of an analog audio sequence s(t) by analyzing visual features extracted from a simultaneously with the recording of the analog audio sequence s(t) recorded video sequence tracking the current location of the speaker's face, lip movements and/or facial expressions of the speaker $S_i$ in subsequent images.

Figure 3B:
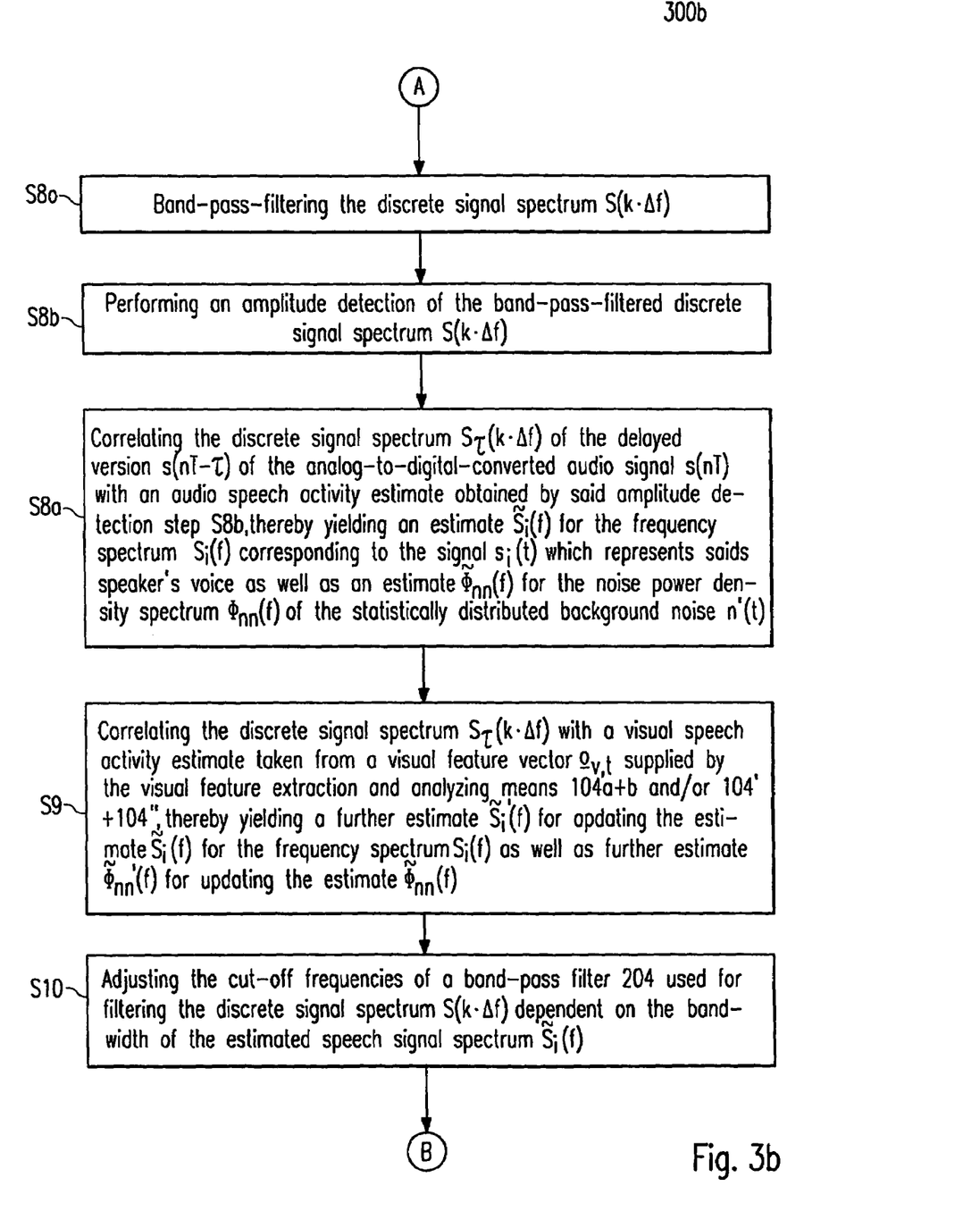
FIG. 3b shows a flow chart illustrating a near-end speaker detection method according to the embodiment depicted in FIG. 2b of the present invention.

In one embodiment of the present invention, which is illustrated in the flow charts depicted in FIGS. 3a+b, a near-end speaker detection method is proposed that is characterized by the step of correlating (S8a) the discrete signal spectrum $S_\tau(k \cdot \Delta f)$ of a delayed version s(nT−τ) of the analog-to-digital-converted audio signal s(nT) with an audio speech activity estimate obtained by an amplitude detection (S8b) of the band-pass-filtered discrete signal spectrum S(k·Δf), thereby yielding an estimate $\tilde{S}_i(f)$ for the frequency spectrum $S_i(f)$ which corresponds to the signal $s_i(t)$ representing said speaker's voice and an estimate $\tilde{\Phi}_{nn}(f)$ for the noise power density spectrum $\Phi_{nn}(f)$ of said background noise ñ(t). Moreover, the discrete signal spectrum $S_\tau(k·\Delta f)$ of a delayed version s(nT−τ) of the analog-to-digital-converted audio signal s(nT) is correlated (S9) with a visual speech activity estimate taken from a visual feature vector $\underline{o}_{v,t}$ which is supplied by the visual feature extraction and analyzing means 104a+b and/or 104'+104", thus yielding a further estimate $\tilde{S}_i'(f)$ for updating the estimate $\tilde{S}_i(f)$ for the frequency spectrum $S_i(f)$ which corresponds to the signal $s_i(t)$ representing the speaker's voice as well as a further estimate $\tilde{\Phi}_{nn}'(f)$ that is used for updating the estimate $\tilde{\Phi}_{nn}(f)$ for the noise power density spectrum $\Phi_{nn}(f)$ of the statistically distributed background noise n'(t). The noise reduction circuit 106 thereby provides a band-pass filter 204 for filtering the discrete signal spectrum S(k·Δf) of the analog-to-digital-converted audio signal s(t), wherein the cut-off frequencies of said band-pass filter 204 are adjusted (S10) dependent on the bandwidth of the estimated speech signal spectrum $\tilde{S}_i(f)$.

Figure 3C:
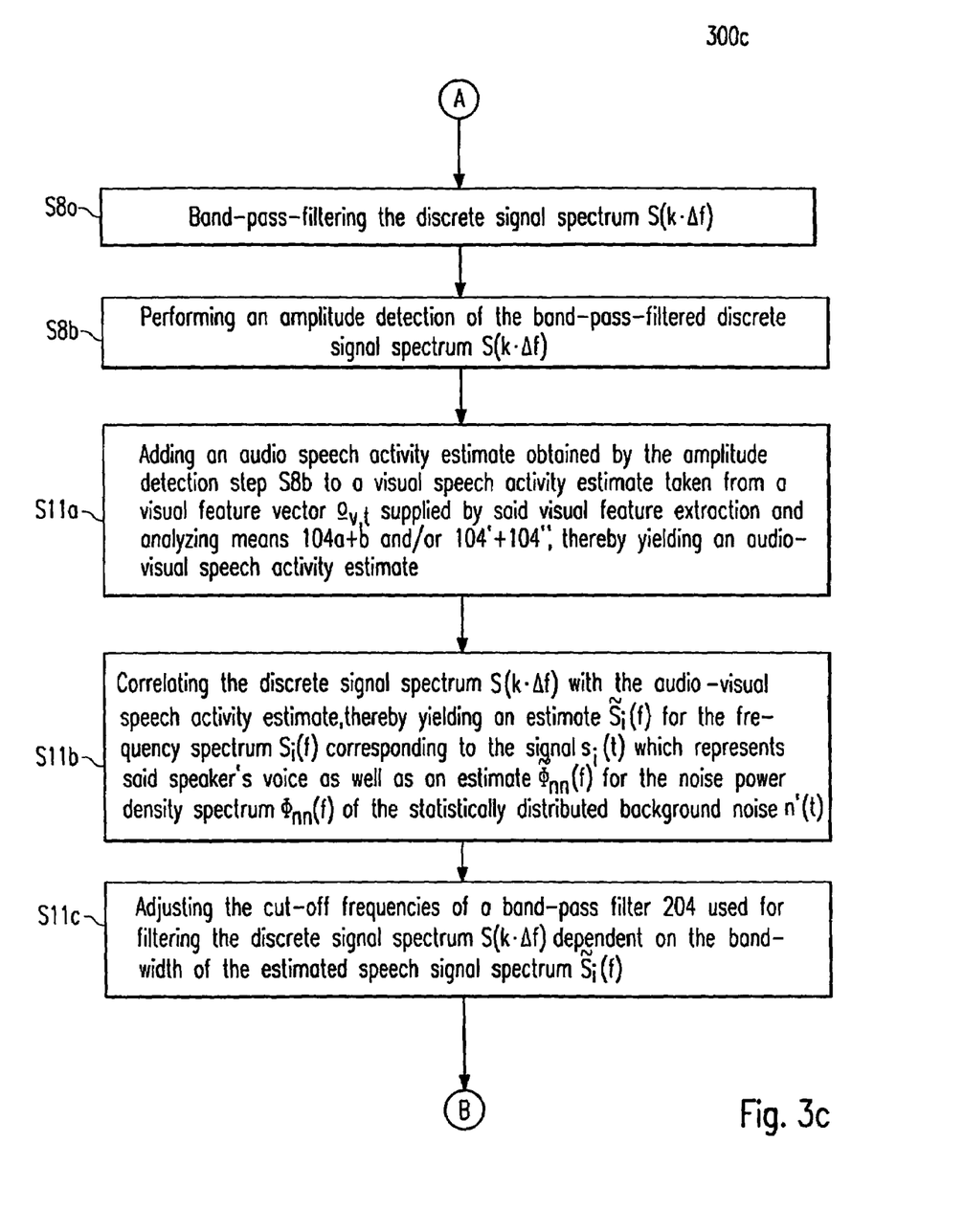
FIG. 3c shows a flow chart illustrating a near-end speaker detection method according to the embodiment depicted in FIG. 2c of the present invention.

In a further embodiment of the present invention as shown in the flow charts depicted in FIGS. 3a+c a near-end speaker detection method is proposed which is characterized by the step of adding (S11a) an audio speech activity estimate obtained by an amplitude detection of the band-pass-filtered discrete signal spectrum S(k·Δf) of the analog-to-digital-converted audio signal s(t) to a visual speech activity estimate taken from a visual feature vector $\underline{o}_{v,t}$, supplied by said visual feature extraction and analyzing means 104a+b and/or 104'+104", thereby yielding an audio-visual speech activity estimate. According to this embodiment, the discrete signal spectrum S(k·Δf) is correlated (S11b) with the audio-visual speech activity estimate, thus yielding an estimate $\tilde{S}_i(f)$ for the frequency spectrum $S_i(f)$ corresponding to the signal $s_i(t)$ that represents said speaker's voice as well as an estimate $\tilde{\Phi}_{nn}(f)$ for the noise power density spectrum $\Phi_{nn}(f)$ of the statistically distributed background noise n'(t). The cut-off frequencies of the band-pass filter 204 that is used for filtering the discrete signal spectrum S(k·Δf) of the analog-to-digital-converted audio signal s(t) are adjusted (S11c) dependent on the bandwidth of the estimated speech signal spectrum $\tilde{S}_i(f)$.

Finally, the present invention also pertains to the use of a noise reduction system 200b/c and a corresponding near-end speaker detection method as described above for a video-telephony based application (e.g. a video conference) in a telecommunication system running on a video-enabled phone having a built-in video camera 101b' pointing at the face of a speaker $S_i$ participating in a video telephony session. This especially pertains to a scenario where a number of persons are sitting in one room equipped with many cameras and microphones such that a speaker's voice interferes with the voices of the other persons.

TABLE

Depicted Features and Their Corresponding Reference Signs

| No. | Technical Feature (System Component or Procedure Step) |
|---|---|
| 100 | noise reduction and speech activity recognition system having an audio-visual user interface, said system being specially adapted for running a real-time lip tracking application which combines visual features $o_{v, nT}$ extracted from a digital video sequence v(nT) showing the face of a speaker $S_i$ by detecting and analyzing the speaker's lip movements and/or facial expressions with audio features $o_{a, nT}$ extracted from an analog audio sequence s(t) representing the voice of said speaker $S_i$ interfered by a statistically distributed background noise n'(t), wherein said audio sequence s(t) includes - aside from the signal representing the voice of said speaker $S_i$ - both environmental noise n(t) and a weighted sum $\Sigma_j a_j \cdot s_j(t - T_j)$ (j ≠ i) of surrounding persons' interfering voices in the environment of said speaker $S_i$ |
| 101a | microphone, used for recording an analog audio sequence s(t) representing the voice of a speaker $S_i$ interfered by a statistically distributed background noise n'(t), which includes both environmental noise n(t) and a weighted sum $\Sigma_j a_j \cdot s_j(t - T_j)$ (with j ≠ i) of surrounding persons' interfering voices in the environment of said speaker $S_i$ |
| 101a' | analog-to-digital converter (ADC), used for converting the analog audio sequence s(t) recorded by said microphone 101a into the digital domain |
| 101b | video camera pointing to the speaker's face for recording a video sequence showing lip movements and/or facial expressions of said speaker $S_i$ |
| 101b' | video camera as described above with an integrated analog-to-digital converter (ADC) |
| 102 | video telephony application, used for transmitting a video sequence showing a speaker's face and lip movements in subsequent images |
| 104 | visual front end of an automatic audio-visual speech recognition system 100 using a bimodal approach to speech recognition and near-speaker detection by incorporating a real-time lip tracking algorithm for deriving additional visual features from lip movements and/or facial expressions of a speaker $S_i$ whose voice is interfered by a statistically distributed background noise n'(t) the visual front end 104 comprising visual feature extraction and analyzing means for continuously or intermittently determining the current location of the speaker's face, tracking lip movements and/or facial expressions of the speaker $S_i$ in subsequent images and determining acoustic-phonetic speech characteristics of the speaker's voice and pronunciation based on detected lip movements and/or facial expressions |
| 104' | visual feature extraction module for continuously tracking lip movements and/or facial expressions of the speaker $S_i$ and determining acoustic-phonetic speech characteristics of the speaker's voice based on detected lip movements and/or facial expressions |
| 104" | visual speech activity detection module for analyzing the acoustic-phonetic speech characteristics and detecting speech activity of a speaker based on said analysis |
| 104a | visual feature extraction means for continuously or intermittently determining the current location of the speaker's face recorded by a video camera 101b at a rate of 1 frame/s |

TABLE-continued

Depicted Features and Their Corresponding Reference Signs

| No. | Technical Feature (System Component or Procedure Step) |
|---|---|
| 104b | visual feature extraction and analyzing means for continuously tracking lip movements and/or facial expressions of the speaker $S_i$ and determining acoustic-phonetic speech characteristics of said speaker's voice based on detected lip movements and/or facial expressions at a rate of 15 frames/s |
| 106 | noise reduction circuit being specially adapted to reduce statistically distributed background noise n'(t) received by said microphone 101a and perform a near-speaker detection by separating the speaker's voice from said background noise n'(t) based on a combination of the speech characteristics which are derived by said audio and visual feature extraction and analyzing means 104a + b and 106b, respectively |
| 106a | digital signal processing means for calculating the discrete signal spectrum $S(k \cdot \Delta f)$ that corresponds to an analog-to-digital-converted version s(nT) of the recorded audio sequence s(t) by performing a Fast Fourier Transform (FFT) |
| 106b | audio feature extraction and analyzing means (e.g. an amplitude detector) for detecting acoustic-phonetic speech characteristics of the speaker's voice and pronunciation based on the recorded audio sequence s(t) |
| 106c | means for estimating the noise power density spectrum $\Phi_{nn}$ (f) of the statistically distributed background noise n'(t) based on the result of the speaker detection procedure performed by said audio-visual feature extraction and analyzing means 104b, 106b, 104' and/or 104" |
| 106c' | means for estimating the signal spectrum $S_i(f)$ of the recorded speech signal $s_i(t)$ based on the result of the speaker detection procedure performed by said audio-visual feature extraction and analyzing means 104b, 106b, 104' and/or 104" |
| 106d | subtracting element for subtracting a discretized version $\tilde{\Phi}_{nn}$ (k · Δf) of the estimated noise power density spectrum $\tilde{\Phi}_{nn}$ (f) from the discrete signal spectrum S(k · Δf) of the analog-to-digital-converted audio sequence s(nT) |
| 106d' | sample-and-hold (S&H) element providing a sampled version $\tilde{\Phi}_{nn}$ (k · Δf) of the estimated noise power density spectrum $\tilde{\Phi}_{nn}$ (f) |
| 106e | digital signal processing means for calculating the corresponding discrete time-domain signal $\hat{s}_i(nT)$ of the obtained difference signal by performing an Inverse Fast Fourier Transform (IFFT) |
| 106f | switch for selectively switching between a first and a second mode for receiving said speech signal $s_i(t)$ with and without using the proposed audio-visual speech recognition approach providing a noise-reduced speech signal $\hat{s}_i(t)$, respectively |
| 107 | multiplier element, used for correlating the discrete signal spectrum S(k · Δf) of the analog-to-digital-converted audio signal s(t) with an audio speech activity estimate which is obtained by an amplitude detection of the digital audio signal s(nT) |
| 107' | multiplier element, used for correlating (S11b) the discrete signal spectrum S(k · Δf) of the analog-to-digital-converted audio signal s(t) with an audio-visual speech activity estimate, obtained by combining an audio feature vector $o_{a, t}$ supplied by said audio feature extraction and analyzing means 106b with a visual feature vector $o_{v, t}$ supplied by said visual speech activity detection module 104", thereby yielding an estimate $\tilde{S}_i(f)$ for the frequency spectrum $S_i(f)$ corresponding to the signal $s_i(t)$ which represents said speaker's voice and an estimate $\tilde{\Phi}_{nn}$ (f) for the noise power density spectrum $\Phi_{nn}$ (f) of the statistically distributed background noise n'(t) |
| 107a | multiplier element, used for correlating (S9) the discrete signal spectrum $S_\tau(k \cdot \Delta f)$ of a delayed version s(nT − τ) of the analog-to-digital-converted audio signal s(nT) with a visual speech activity estimate taken from a visual feature vector $o_{v,t}$ supplied by the visual feature extraction and analyzing means 104a + b and/or 104' + 104", thereby yielding a further estimate $\tilde{S}_i'$ (f) for updating the estimate $\tilde{S}_i$ (f) for the frequency spectrum $S_i(f)$ corresponding to the signal $s_i(t)$ which represents said speaker's voice as well as a further estimate $\tilde{\Phi}_{nn}'$ (f) for updating the estimate $\tilde{\Phi}_{nn}$ (f) for the noise power density spectrum $\tilde{\Phi}_{nn}$ (f) of the statistically distributed background noise n'(t) |
| 107b | multiplier element, used for correlating (S8a) the discrete signal spectrum $S_\tau(k \cdot \Delta f)$ of a delayed version s(nT − τ) of the analog-to-digital-converted audio signal s(nT) with an audio speech activity estimate obtained by an amplitude detection (S8b) of the band-pass-filtered discrete signal spectrum S(k · Δf), thereby yielding an estimate $\tilde{S}_i$ (f) for the frequency spectrum $S_i(f)$ corresponding to the signal $s_i(t)$ which represents said speaker's voice as well as an estimate $\tilde{\Phi}_{nn}$ (f) for the noise power density spectrum $\Phi_{nn}$ (f) of the statistically distributed background noise n'(t) |
| 107c | summation element, used for adding (S11a) the audio speech activity estimate to the visual speech activity estimate, thereby yielding an audio-visual speech activity estimate |
| 108 | multi-channel acoustic echo cancellation unit being specially adapted to perform a near-end speech detection and/or double-talk detection algorithm based on acoustic-phonetic speech characteristics derived by said audio and visual feature extraction and analyzing means 104a + b and 106b, respectively |
| 108a | means for near-end talk and/or double-talk detection, integrated in the multi-channel acoustic echo cancellation unit 108 |
| 200a | block diagram showing a conventional noise reduction and speech activity recognition system for a telephony-based application based on an audio speech activity estimation according to the state of the art, wherein the discrete signal spectrum S(k · Δf) of the analog-to-digital-converted audio signal s(t) is correlated with an audio speech activity estimate which is obtained by an amplitude detection of the digital audio signal s(nT) |
| 200b | block diagram showing an example of a slow camera-enhanced noise reduction and speech activity recognition system for a telephony-based application implementing an audio-visual speech activity estimation algorithm according to one embodiment of the |

TABLE-continued

Depicted Features and Their Corresponding Reference Signs

| No. | Technical Feature (System Component or Procedure Step) |
|---|---|
| | present invention, wherein the discrete signal spectrum $S_\tau(k \cdot \Delta f)$ of a delayed version $s(nT - \tau)$ of the analog-to-digital-converted audio signal $s(nT)$ is correlated (S8a) with an audio speech activity estimate obtained by an amplitude detection (S8b) of the band-pass-filtered discrete signal spectrum $S(k \cdot \Delta f)$, thereby yielding an estimate $\tilde{S}_i(f)$ for the frequency spectrum $S_i(f)$ corresponding to the signal $s_i(t)$ which represents said speaker's voice and an estimate $\tilde{\Phi}_{nn}(f)$ for the noise power density spectrum $\Phi_{nn}(f)$ of the statistically distributed background noise $n'(t)$, and also correlated (S9) with a visual speech activity estimate taken from a visual feature vector $o_{v,t}$ supplied by the visual feature extraction and analyzing means 104a + b and/or 104' + 104'', thereby yielding a further estimate $\tilde{S}_i'(f)$ for updating the estimate $\tilde{S}_i(f)$ for the frequency spectrum $S_i(f)$ corresponding to the signal $s_i(t)$ which represents said speaker's voice as well as a further estimate $\tilde{\Phi}_{nn}'(f)$ for updating the estimate $\tilde{\Phi}_{nn}(f)$ for the noise power density spectrum $\Phi_{nn}(f)$ of the statistically distributed background noise $n'(t)$ |
| 200c | block diagram showing an example of a fast camera-enhanced noise reduction and speech activity recognition system for a telephony-based application implementing an audio-visual speech activity estimation algorithm according to a further embodiment of the present invention, wherein the discrete signal spectrum $S(k \cdot \Delta f)$ of the analog-to-digital-converted audio signal $s(t)$ is correlated (S11b) with an audio-visual speech activity estimate, obtained by combining an audio feature vector $o_{a,t}$ which is supplied by said audio feature extraction and analyzing means 106b with a visual feature vector $o_{v,t}$ supplied by the visual speech activity detection module 104'', thereby yielding an estimate $\tilde{S}_i(f)$ for the corresponding frequency spectrum $S_i(f)$ of the signal $s_i(t)$ which represents said speaker's voice as well as an estimate $\tilde{\Phi}_{nn}(f)$ for the noise power density spectrum $\Phi_{nn}(f)$ of the statistically distributed background noise $n'(t)$ |
| 202 | delay element, providing a delayed version of the discrete signal spectrum $S(k \cdot \Delta f)$ of the analog-to-digital-converted audio signal $s(t)$ |
| 204 | band-pass filter with adjustable cut-off frequencies which can be adjusted dependent on the bandwidth of the estimated speech signal spectrum $\tilde{S}_i(f)$, used for filtering the discrete signal spectrum $S(k \cdot \Delta f)$ of the analog-to-digital-converted audio signal $s(t)$ |
| 300a | flow chart illustrating a near-end speaker detection method reducing the noise level of a detected analog audio sequence $s(t)$ according to the embodiment depicted in FIG. 1 of the present invention |
| 300b | flow chart illustrating a near-end speaker detection method according to the embodiment depicted in FIG. 2b of the present invention |
| 300c | flow chart illustrating a near-end speaker detection method according to the embodiment depicted in FIG. 2c of the present invention |
| SW | means for switching said microphone 101a off when the actual level of the speech activity indication signal $\hat{s}_i(nT)$ falls below a predefined threshold value (not shown) |
| S1 | step #1: subjecting the analog audio sequence $s(t)$ to an analog-to-digital conversion |
| S10 | step #10: adjusting the cut-off frequencies of the band-pass filter 204 used for filtering the discrete signal spectrum $S(k \cdot \Delta f)$ of the analog-to-digital-converted audio signal $(s(t))$ dependent on the bandwidth of the estimated speech signal spectrum $\tilde{S}_i(f)$ |
| S11a | step #11a: adding an audio speech activity estimate which is obtained by an amplitude detection of the band-pass-filtered discrete signal spectrum $S(k \cdot \Delta f)$ of the analog-to-digital-converted audio signal $s(t)$ to a visual speech activity estimate taken from a visual feature vector $o_{v,t}$ supplied by the visual feature extraction and analyzing means 104a + b and/or 104' + 104'', thereby yielding an audio-visual speech activity estimate |
| S11b | step #11b: correlating the discrete signal spectrum $S(k \cdot \Delta f)$ with the audio-visual speech activity estimate, thereby yielding an estimate $\tilde{S}_i(f)$ for the frequency spectrum $S_i(f)$ corresponding to the signal $s_i(t)$ which represents said speaker's voice as well as an estimate $\tilde{\Phi}_{nn}(f)$ for said noise power density spectrum $\Phi_{nn}(f)$ |
| S11c | step #11c: adjusting the cut-off frequencies of a band-pass filter 204 used for filtering the discrete signal spectrum $S(k \cdot \Delta f)$ of the analog-to-digital-converted audio signal $s(t)$ dependent on the bandwidth of the estimated speech signal spectrum $\tilde{S}_i(f)$ |
| S2 | step #2: calculating the corresponding discrete signal spectrum $S(k \cdot \Delta f)$ of the analog-to-digital-converted audio sequence $s(nT)$ by performing a Fast Fourier Transform (FFT) |
| S3 | step #3: detecting the voice of said speaker $S_i$ from said signal spectrum $S(k \cdot \Delta f)$ by analyzing visual features extracted from a simultaneously with the recording of the audio sequence $s(t)$ recorded video sequence for tracking the current location of the speaker's face, lip movements and/or facial expressions of the speaker $S_i$ in subsequent images, |
| S4 | step #4: estimating the noise power density spectrum $\Phi_{nn}(f)$ of the statistically distributed background noise $n'(t)$ based on the result of the speaker detection step S3 |
| S5 | step #5: subtracting a discretized version $\tilde{\Phi}_{nn}(k \cdot \Delta f)$ of the estimated noise power density spectrum $\tilde{\Phi}_{nn}(f)$ from the discrete signal spectrum $S(k \cdot \Delta f)$ of the analog-to-digital-converted audio sequence $s(nT)$ |
| S6 | step #6: calculating the corresponding discrete time-domain signal $\hat{s}_i(nT)$ of the obtained difference signal by performing an Inverse Fast Fourier Transform (IFFT) |
| S7 | step #7: conducting a multi-channel acoustic echo cancellation algorithm which models echo path impulse responses by means of adaptive finite impulse response (FIR) filters and subtracts echo signals from the analog audio sequence $s(t)$ based on acoustic-phonetic speech characteristics derived by an algorithm for extracting visual features from a video sequence tracking the location of a speaker's face, lip movements and/or facial expressions of the speaker $S_i$ in subsequent images |

TABLE-continued

Depicted Features and Their Corresponding Reference Signs

| No. | Technical Feature (System Component or Procedure Step) |
|---|---|
| S8o | step #8o: band-pass-filtering the discrete signal spectrum $S(k \cdot \Delta f)$ of the analog-to-digital-converted audio signal $s(nT)$ |
| S8a | step #8a: correlating the discrete signal spectrum $S_\tau(k \cdot \Delta f)$ of a delayed version $s(nT - \tau)$ of the analog-to-digital-converted audio signal $s(nT)$ with an audio speech activity estimate obtained by the amplitude detection step S8b |
| S8b | step #8b: amplitude detection of the band-pass-filtered discrete signal spectrum $S(k \cdot \Delta f)$, thereby yielding an estimate $\tilde{S}_i(f)$ for the frequency spectrum $S_i(f)$ corresponding to the signal $s_i(t)$ which represents said speaker's voice as well as an estimate $\tilde{\Phi}_{nn}(f)$ for the noise power density spectrum $\Phi_{nn}(f)$ |
| S9 | step #9: correlating the discrete signal spectrum $S_\tau(k \cdot \Delta f)$ of a delayed version $s(nT - \tau)$ of the analog-to-digital-converted audio signal $s(nT)$ with a visual speech activity estimate taken from a visual feature vector $o_{v,\,t}$ supplied by the visual feature extraction and analyzing means 104a + b and/or 104' + 104", thereby yielding a further estimate $\tilde{S}_i'(f)$ for updating the estimate $\tilde{S}_i(f)$ for the frequency spectrum $S_i(f)$ corresponding to the signal $s_i(t)$ which represents said speaker's voice as well as a further estimate $\tilde{\Phi}_{nn}'(f)$ for updating the estimate $\tilde{\Phi}_{nn}(f)$ for the noise power density spectrum $\tilde{\Phi}_{nn}(f)$ of the statistically distributed background noise $n'(t)$ |
| S10 | step #10: adjusting the cut-off frequencies of a band-pass filter 204 used for filtering the discrete signal spectrum $S(k \cdot \Delta f)$ of the analog-to-digital-converted audio signal $s(t)$ dependent on the bandwidth of the estimated speech signal spectrum $\tilde{S}_i(f)$ |
| S11a | step #11a: adding an audio speech activity estimate obtained by an amplitude detection of the band-pass-filtered discrete signal spectrum $S(k \cdot \Delta f)$ of the analog-to-digital-converted audio signal $s(t)$ to a visual speech activity estimate taken from a visual feature vector $o_{v,\,t}$ supplied by said visual feature extraction and analyzing means 104a + b, and/or 104' + 104", thereby yielding an audio-visual speech activity estimate |
| S11b | step #11b: correlating the discrete signal spectrum $S(k \cdot \Delta f)$ with the audio-visual speech activity estimate, thus yielding an estimate $\tilde{S}_i(f)$ for the frequency spectrum $S_i(f)$ corresponding to the signal $s_i(t)$ which represents said speaker's voice as well as an estimate $\tilde{\Phi}_{nn}(f)$ for the noise power density spectrum $\Phi_{nn}(f)$ of the statistically distributed background noise $n'(t)$ |
| S11c | step #11c: adjusting the cut-off frequencies of a band-pass filter 204 used for filtering the discrete signal spectrum $S(k \cdot \Delta f)$ of the analog-to-digital-converted audio signal $s(t)$ dependent on the bandwidth of the estimated speech signal spectrum $\tilde{S}_i(f)$ |

The invention claimed is:

1. A noise reduction system including an audio-visual user interface therein for combining visual features extracted from a digital video sequence with audio features extracted from an analog audio sequence including background noise in an environment of a speaker, said noise reduction system comprising:

an audio sequence detection device for detecting said analog audio sequence;

an audio feature extraction and analysis device for analyzing said analog audio sequence and extracting said audio features therefrom;

a video sequence detection device for detecting said video sequence;

a visual feature extraction and analysis device for analyzing the detected video sequence and extracting said visual features therefrom;

a noise reduction circuit configured to separate a speaker's voice from said background noise based on a combination of derived speech characteristics by removing said separated background noise from said analog audio sequence and configured to output a speech activity indication signal comprising a combination of speech activity estimates supplied by said audio feature extraction and analysis device and said visual feature extraction and analysis device; and a multi-channel acoustic echo cancellation unit configured to perform a near-end speaker detection and double-talk detection algorithm based on the speech characteristics derived by said audio feature extraction and analysis device and said visual feature extraction and analysis device, wherein said noise reduction circuit is further configured to subtract a discretized version of an estimated noise power density spectrum of said background noise from a discrete signal spectrum of an analog-to-digital converted version of said analog audio sequence, said estimated noise power density spectrum being based on said audio features, said visual features and said discrete signal spectrum.

2. A noise reduction system according to claim 1, further comprising:

a device for switching off an audio channel if said speech activity indication signal falls below a predefined threshold value.

3. A noise reduction system according to claim 1, wherein said audio feature extraction and analysis device comprises an amplitude detector.

4. A telecommunication device equipped with an audio-visual user interface and including the noise reduction system according to claim 1.

5. A near-end speaker detection method for reducing noise in a detected analog audio sequence, said method comprising:

converting said analog audio sequence into a digital audio sequence;

calculating a corresponding discrete signal spectrum of the digital audio sequence by performing a Fast Fourier Transform (FFT);

detecting a voice of a speaker from said discrete signal spectrum by analyzing visual features extracted from a video sequence associated with extracted and analyzed audio features of the audio sequence, the visual features including current locations of face, lip movements and/ or facial expressions of the speaker in a sequence of images in the video sequence;

estimating a noise power density spectrum of statistically distributed background noise based on said audio features, said visual features and said discrete signal spectrum;

subtracting a discretized version of the estimated noise power density spectrum from the discrete signal spectrum of the digital audio sequence to obtain a difference signal; and calculating a corresponding discrete time-domain signal of the obtained difference signal by performing an Inverse Fast Fourier Transform (IFFT) to provide a recognized speech signal.

6. A near-end speaker detection method according to claim 5, further comprising:

performing a multi-channel acoustic echo cancellation algorithm which models echo path impulse responses by means of adaptive finite impulse response (FIR) filters and subtracts echo signals from the analog audio sequence based on acoustic-phonetic speech characteristics derived by an algorithm for extracting the visual features from the video sequence associated with the audio sequence and including the locations of the face, lip movements and/or facial expressions of the speaker in a sequence of images in the video sequence.

7. A near-end speaker detection method according to claim 6, wherein said multi-channel acoustic echo cancellation algorithm performs a double-talk detection procedure.

8. A near-end speaker detection method according to claim 5, wherein said acoustic-phonetic speech characteristics are based on detecting opening of a mouth of the speaker as an estimate of acoustic energy of articulated vowels and/or diphthongs, detecting rapid movement of the lips of the speaker as a hint to labial or labio-dental consonants, and/or detecting other phonetic characteristics associated with position and movement of the lips and/or voice and/or pronunciation of said speaker.

9. A near-end speaker detection method according to claim 5, wherein detecting the voice of said speaker comprises:

detecting the voice of said speaker from the discrete signal spectrum of the digital audio sequence using a learning procedure by analyzing the visual features extracted from the video sequence associated with the audio sequence and including the current locations of the face, lip movements and/or facial expressions of the speaker in a sequence of images in the video sequence.

10. A near-end speaker detection method according to claim 5, further comprising:

correlating the discrete signal spectrum of a delayed version of the digital audio signal with an audio speech activity estimate obtained by amplitude detection of a band-pass-filtered discrete signal spectrum to provide an estimate for a frequency spectrum corresponding to a signal which represents a voice of said speaker as well as an estimate for the noise power density spectrum of the statistically distributed background noise.

11. A near-end speaker detection method according to claim 10, further comprising:

correlating the discrete signal spectrum of the delayed version of the digital audio signal with a visual speech activity estimate taken from a visual feature vector supplied by the visual feature extraction and analyzing device to provide a further estimate for updating the estimate for the frequency spectrum corresponding to the signal which represents said speaker's voice as well as a further estimate for updating the estimate for the noise power density spectrum of the statistically distributed background noise.

12. A near-end speaker detection method according to claim 10, further comprising:

adjusting cut-off frequencies of a band-pass filter used for filtering the discrete signal spectrum of the digital audio sequence based on a bandwidth of the estimated frequency spectrum.

13. A near-end speaker detection method according to claim 5, further comprising:

adding an audio speech activity estimate obtained by amplitude detection of a band-pass-filtered discrete signal spectrum of the digital audio sequence to a visual speech activity estimate taken from a visual feature vector supplied by said visual feature extraction and analyzing device to provide an audio-visual speech activity estimate, correlating the discrete signal spectrum with the audio-visual speech activity estimate to provide an estimate for a frequency spectrum corresponding to a signal which represents a voice of said speaker as well as an estimate for the noise power density spectrum of the statistically distributed background noise; and adjusting cut-off frequencies of a band-pass filter used for filtering the discrete signal spectrum of the digital audio sequence based on a bandwidth of the estimated frequency spectrum.

14. A telecommunication system configured to perform the near-end speaker detection method of claim 5.

15. A telecommunication system, comprising:

a video-enabled phone;

a video-telephony based application running on the video-enabled phone; and a video camera built-in to the video-enabled phone and pointing at a face of a speaker participating in a video telephony session, wherein said video-telephony based application comprises:

an audio sequence detection device for detecting an analog audio sequence;

an audio feature extraction and analysis device for analyzing said analog audio sequence and extracting said audio features therefrom;

a video sequence detection device for detecting said video sequence;

a visual feature extraction and analysis device for analyzing the detected video sequence and extracting said visual features therefrom;

a noise reduction device for separating a speaker's voice from said background noise based on a combination of derived speech characteristics by removing said separated background noise from said analog audio sequence and outputting a speech activity indication signal comprising a combination of speech activity estimates supplied by said audio feature extraction and analysis device and said visual feature extraction and analysis device; and a multi-channel acoustic echo cancellation device for performing a near-end speaker detection and double-talk detection algorithm based on the speech characteristics derived by said audio feature extraction and analysis device and said visual feature extraction and analysis device, wherein said noise reduction device is further configured to subtract a discretized version of an estimated noise power density spectrum of said background noise from a discrete signal spectrum of an analog-to-digital converted version of said analog audio sequence, said estimated noise power density spectrum being based on said audio features, said visual features and said discrete signal spectrum.

* * * * *

UNITED STATES PATENT AND TRADEMARK OFFICE
CERTIFICATE OF CORRECTION

PATENT NO. : 7,684,982 B2  Page 1 of 1
APPLICATION NO. : 10/542869
DATED : March 23, 2010
INVENTOR(S) : Taneda

It is certified that error appears in the above-identified patent and that said Letters Patent is hereby corrected as shown below:

On Title Page:
Item 75, Inventor: Please correct Inventor's city and country "Munich (DE)"
to read -- Tokyo (JP) --

Column 1, Line 7: Please correct "35 U.S.C. 0371" to read -- 35 U.S.C. § 371 --

Signed and Sealed this

Sixth Day of July, 2010

David J. Kappos
*Director of the United States Patent and Trademark Office*